United States Patent
Rolff

(10) Patent No.: US 9,698,424 B2
(45) Date of Patent: Jul. 4, 2017

(54) ALIGINATES AS BINDERS FOR BATTERY CATHODES

(71) Applicant: ROBERT BOSCH GMBH, Stuttgart (DE)

(72) Inventor: Malte Rolff, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/401,015

(22) PCT Filed: Apr. 19, 2013

(86) PCT No.: PCT/EP2013/058136
§ 371 (c)(1),
(2) Date: Nov. 13, 2014

(87) PCT Pub. No.: WO2013/171021
PCT Pub. Date: Nov. 21, 2013

(65) Prior Publication Data
US 2016/0013490 A1   Jan. 14, 2016

(30) Foreign Application Priority Data

May 18, 2012   (DE) .......................... 10 2012 208 321

(51) Int. Cl.
| | |
|---|---|
| *H01M 4/88* | (2006.01) |
| *H01M 4/62* | (2006.01) |
| *H01M 4/04* | (2006.01) |
| *H01M 4/36* | (2006.01) |
| *H01M 4/38* | (2006.01) |
| *H01M 4/505* | (2010.01) |
| *H01M 4/525* | (2010.01) |
| *H01M 4/58* | (2010.01) |
| *H01M 10/0525* | (2010.01) |
| *H01M 4/131* | (2010.01) |
| *H01M 4/1391* | (2010.01) |
| *H01M 4/02* | (2006.01) |

(52) U.S. Cl.
CPC ......... *H01M 4/622* (2013.01); *H01M 4/0402* (2013.01); *H01M 4/0404* (2013.01); *H01M 4/131* (2013.01); *H01M 4/1391* (2013.01); *H01M 4/364* (2013.01); *H01M 4/38* (2013.01); *H01M 4/505* (2013.01); *H01M 4/525* (2013.01); *H01M 4/5815* (2013.01); *H01M 4/625* (2013.01); *H01M 10/0525* (2013.01); *H01M 2004/028* (2013.01)

(58) Field of Classification Search
CPC ........ H01M 2/16; H01M 4/0404; H01M 4/38; H01M 4/622; H01M 4/364; C01G 45/1257
USPC ........ 252/506, 511, 182.1; 427/58; 429/217, 429/178, 206
See application file for complete search history.

(56) References Cited

U.S. PATENT DOCUMENTS

| | | | |
|---|---|---|---|
| 5,759,714 A * | 6/1998 | Matsufuji | ............ H01M 4/485 429/218.1 |
| 6,235,427 B1 | 5/2001 | Idota et al. | |
| 2001/0026890 A1 | 10/2001 | Ono et al. | |
| 2010/0143767 A1 | 6/2010 | Wang et al. | |
| 2011/0052981 A1 * | 3/2011 | Lopez | ................ C01G 45/1257 429/206 |
| 2011/0229757 A1 * | 9/2011 | Kawakami | ............ H01M 4/364 429/178 |
| 2012/0088155 A1 | 4/2012 | Yushin et al. | |

FOREIGN PATENT DOCUMENTS

| | | |
|---|---|---|
| DE | 10 2011 113166 | 3/2012 |
| GB | 208 744 | 12/1923 |

OTHER PUBLICATIONS

Jiaxin Li et al : "Enhanced performance of a Mn02-graphene sheet cathode for lithium ion batteries using sodium alginate as a binder", Journal of Materials Chemistry, pp. 13002-13004, XP055067922, ISSN : 0959-9428, DOI : 10.1039/c2jm31583a.
I.Kovalenko et al : "A Major Constituent of Brown Algae for Use in High-Capacity Li-Ion Batteries", Science, vol. 334, Nr. 6052, Sep. 8, 2011, pp. 75-79, XP055067920, ISSN : 0036-8075, DOI : 10.1126/science.1209150.

* cited by examiner

*Primary Examiner* — Khanh Tuan Nguyen
(74) *Attorney, Agent, or Firm* — Norton Rose Fulbright US LLP; Gerard Messina

(57) ABSTRACT

A cathode unit for a battery, in which the cathode includes a viscoelastic, and a polymeric gel former selected from the group of natural polysaccharides having a proportion of carboxylate or carboxylic acid groups of greater than or equal to 0.5 and less than or equal to 2.0 in relation to the number of monomer units. Also described is a method for manufacturing the cathode units and the use of a battery including the cathode unit according to the invention for power supply.

12 Claims, No Drawings

ALGINATES AS BINDERS FOR BATTERY CATHODES

FIELD OF THE INVENTION

The present invention relates to alginates as binders for battery cathodes.

BACKGROUND INFORMATION

Lithium-ion batteries are capable of providing high charge densities and a high specific charge.

Undesirable chemical changes on the electrode material, which are induced by the charging/discharging operation, are the cause of the inadequate cycle stability of batteries. This is accompanied by a loss of electrical power. For example, in the case of lithium-ion batteries, e.g., NCM (nickel-cobalt-manganese oxide) or HE (high-energy) NCM battery types, due to the intercalation process of the lithium in addition to solvent molecules, substantial volume changes of the battery active material and possibly elutions of individual metals may occur. In particular lithium-sulfide types (Li/S types) have mechanical cracks in the active material or losses/changes of the electrode surface in general as a result of the charging/discharging operations. For Li/S types, diffusion of the polysulfides out of the cathode may occur, which may then react with the lithium metal electrode in the most unfavorable case. All of these undesirable secondary reactions share the feature that the electrode itself and in particular the surface structure of the electrode is modified in such a way that substance losses or structure changes may be induced, which significantly reduce the performance capacity of the battery and in the worst case result in destruction of the entire cell structure.

A feasible path for mechanical stabilization of the electrode and in particular of the electrode surface is the addition of polymers to the active material. The polymers may be mixed with the electrode active material and thus stabilize the mechanical cohesion of the active material. They "bind" the active material and are therefore also referred to as electrode binders. Electrode binders in general ensure the mechanical stability of the electrodes and the contacting of the particles made of electrochemically active material with one another and with the current arrester. Furthermore, conductivity-improving additives may contribute to improved electrical connection of the electrochemically active particles to the current arrester. All additives should be electrochemically stable at least in the potential range of the particular electrode and should have a chemically inert character in relation to common electrolyte solutions.

Furthermore, polymers may also accumulate solidly on electrode surfaces and form a protective layer thereon, similar to the so-called SEI (solid electrolyte phase) on anodes. This intermediate layer coats the entire surface of the active material and prevents an excessively strong volume change as a result of the running intercalation operations. In the most favorable case, this protective layer has the result that only the small lithium ions may still diffuse into the active material and solvent molecules or other decomposition products may no longer interact with the active material. This external layer is thus similar in its function to a solid electrolyte which is permeable to lithium ions.

Polyvinylidene fluoride (PVDF) is added as a standard electrode binder in lithium-ion batteries. The PVDF stabilizes the electrode in a purely mechanical way; however, the formation of an electrode-protecting SEI may not be achieved via the addition of PVDF. In addition, it is disadvantageous that the mechanical stabilization is inadequate and only unsatisfactory cycle stability is achieved in the application.

One way of improving the situation is described, for example, by DE 1020 0800 0113. In this patent application, anode and/or cathode compounds for use in a lithium-ion polymer cell and the use thereof for polymer cells are described, which are characterized in that the electrode compounds contain a binder based on polyalkali silicates and are coated as dispersions on primed electrode arresters.

Furthermore, DE 10 2011 113166 provides a method for producing a cathode of a liquid electrolyte capacitor, the method including the application of a precursor solution to a roughened surface of a metal substrate and the precursor solution containing a substituted thiophene monomer and an oxidative catalyst. The oxidative catalyst is used in a less-than-stoichiometric quantity and the polymerization of the substituted thiophene monomer is carried out with formation of a coating which contains an intrinsically conductive substituted polythiophene.

Patent document US 2010 0143767 A1 discusses, in contrast, an electrolyte composition made of a solvent, a strongly branched polymer, and a polymer having high ionic conductivity. The polymer having high ionic conductivity and the strongly branched polymer are uniformly distributed via the solvent and the strongly branched polymer has a branching factor of greater than 0.5.

In the more recent scientific literature, for example, Kovalenko, I. et al. (Science Vol. 334, 2011, pages 75-79), approaches are additionally found in which brown algae extracts are provided for the exclusive construction of anodes in lithium-ion batteries. It is described in this citation, inter alia, that a lithium nanopowder having alginates, i.e., natural polysaccharides extracted from brown algae, may be used for constructing stable battery anodes, the capacitance of which is approximately eight times higher than that of presently known anodes based on graphite.

SUMMARY OF THE INVENTION

An object of the present invention is to provide a cathode unit for a battery, which is more cost-effective to implement compared to the related art and has an extended service life, and a method for the manufacture thereof. The object is achieved by the features of Claim 1 and the method for manufacturing the aforementioned cathode units is described in a further independent claim. The subclaims describe specific embodiments.

Surprisingly, it has been found that battery cathode units may be stabilized by the addition of viscoelastic, polymeric gel formers selected from the group of natural polysaccharides having a proportion of carboxylate or carboxylic acid groups of greater than or equal to 0.5 and less than or equal to 2.0 in relation to the number of monomer units in such a way that volume changes of the active material may be significantly better compensated for and a more stable SEI is constructed. This results in fewer undesirable secondary reactions of the cathode with the electrolyte and the solvent and thus significantly improved cycle stability is achieved for batteries.

This is surprising and not obvious, since due to the carboxyl or carboxylate groups of the gel former according to the present invention, above all in the case of lithium-based battery systems and in particular in the case of NCM or HE-NCM cathode materials, a chemical bond of the polymer to the metal centers of the active material is to be expected. This has a negative effect on the electrode, itself and in particular on the electrode surface. Consumption or inactivation of electrode material may possibly occur. Since the anodes in batteries and in particular in lithium-ion batteries display an entirely different composition and an entirely different construction than the cathodes according to the present invention, no conclusions about the applicability in the area of the battery cathode may be drawn by a use of similar polymer binder materials in the anode area.

DETAILED DESCRIPTION

The term "battery" in the meaning of the present invention is a galvanic cell, which is connected in series, in a housing. A single galvanic element may also form a battery. An energy-providing chemical reaction takes place during the discharge of a battery, which is composed of two partial reactions, which are electrically coupled to one another but are spatially separated from one another. One partial reaction, which occurs at comparatively lower redox potential, runs on the negative electrode, and one partial reaction, which takes place at comparatively higher redox potential, runs on the positive electrode. During the discharge, electrons are released at the negative electrode by an oxidation process, resulting in an electron current via an external consumer to the positive electrode, which absorbs a corresponding amount of electrons. A reduction process therefore takes place at the positive electrode. At the same time, an ion current corresponding to the electrode reaction occurs within the cell. This ion current is ensured by an ion-conducting electrolyte. In secondary cells and batteries, this discharge reaction is reversible, i.e., the possibility exists of reversing the conversion of chemical energy into electrical energy taking place during the discharge. If the terms anode and cathode are used in this context, the electrodes are generally named in accordance with its discharge function. The negative electrode is thus the anode in such cells, and the positive electrode is the cathode. Batteries in the meaning of the present invention represent all galvanic cells which have metals, inorganic elements, or compounds such as sulfur and/or organic molecules, for example, carbon as the electrode material or active material. In general, batteries in the meaning of the present invention include the lead accumulator, the nickel cadmium cell, the nickel metal hydride battery, the zinc air accumulator, all forms of lithium batteries, here in particular lithium-ion batteries and lithium-polymer batteries.

A cathode unit includes a metallic arrester, at least one active material, a viscoelastic polymeric gel former, and a solvent. A cathode unit may optionally also have conducting salts, one or multiple solvents, and further metallic components ("blends").

The metallic arrester may have a rough surface or a smooth surface and may be made of stainless steel, titanium, aluminum, lead, nickel, zinc, or indium-tin oxide (ITO). Furthermore, porous alloys based on aluminum, for example, porous alloys made of aluminum, nickel, and chromium, come into consideration as the arrester.

The active material of a cathode unit according to the present invention may be made of the same material as the metallic arrester or, in specific embodiments, may be made of sulfur-carbon composites, SPAN (mixtures of sulfur and polyacrylonitrile), lithium metal, lithium-graphite composites, lithium-aluminum composites, lithium-coke composites, lithium-carbon nanotubes, $Li_xWO_x2Li$ polyacetylene, $Li_xMoO_2$, $LiMoS_2$, $Li_xTiO_2$, $LMoO_3$, $Li_xV_6O_{13}$, $Li_xMnO_2$, $Li_xCr_3O_6$, $Li_xV_2O_5$, $Li_xNiO_2$, $Li_xCoO_2$, $Li_xMn_2O_4$ (spinel), index X being between 0.1 and 5. An active material may be selected from the group of $LiMO_2$, M being selected from the group nickel, cobalt, and manganese.

Protic solvents and also aprotic, organic solvents may be used as solvents in the cathode unit according to the present invention as a function of the selection of the active material. According to the present invention, the protic solvents are water-based and/or alcohol-based systems and the aprotic, organic solvents are, for example, organic solvents such as propylene carbonate, ethylene carbonate, ethyl methyl carbonate, dimethyl carbonate, acetonitrile, γ-butyrolactone, and possibly also inorganic solvents, for example, thionyl chloride.

The cathode unit may optionally also have conducting salts. Conducting salts for organic, aprotic solvents in the meaning of the present invention are easily soluble conducting salts, e.g., $LiClO_4$, $LiPF_6$, $LiBF_4$, $LiCF_3SO_3$, lithium-bis(oxalato)borate (LIBOB), or $LiN(SO_2CF_3)_2$. Conducting salts or conducting substances for batteries based on aqueous systems may be represented above all by inorganic acids.

Furthermore, the cathode unit may additionally contain further metallic compounds. These metallic compounds, also referred to as "blends" in the literature, are added for safety reasons and stabilize the active material, but undesirably result in worsening of the electrochemical properties. For example, aluminum may be used as a blend material.

According to the present invention, the battery cathode unit contains a viscoelastic gel former selected from the group of natural polysaccharides.

A gel is a dispersed system made of at least one solid component and one liquid component. The solid component may be formed by polymers, which are capable of interacting with one another and thus implementing a coherent, three-dimensional network within the liquid. The interactions of the individual polymer chains with one another may be of an electrostatic nature or may be distinguished by van der Waals forces or hydrogen bonds. The individual polymer chains may also be partially covalently bonded to one another. The present invention includes in particular those unbranched polymers, which form a viscoelastic network or gel in solution.

In this context, viscoelasticity means that the polymer network displays a time-dependent and reversible deformation due to the action of an external force, a shear stress. This means, in particular, that the viscosity of the solution decreases with increasing shear stress and the original viscosity arises again with a time delay after ending the mechanical load. This may be the behavior according to the present invention, since an alignment of the individual polymer chains in the solution highly probably occurs due to the shear stress. Without being bound by a theory, the alignment of the individual polymer chains causes a reduction of the viscosity of the solution. If further materials, for example, an active material, are mixed into the solution, a deeper unification between active material and polymer may be achieved. The deeper mixing may have the result that the active material is protected from an excessively strong volume expansion in the intercalation process. In addition, the newly forming network may have a different structure than a network which was not previously mechanically loaded.

The viscoelastic polymeric gel former is selected from the group of natural polysaccharides. Natural polysaccharides include, for example, homoglycans or heteroglycans, for example, alginates, carrageenans, pectins, tragacanths, guar gum, locust bean gum, agar agar, gum arabic, xanthan gum, natural and modified starches, dextrans, dextrin, maltodextrins, chitosan, glucans, such as beta-1,3-glucan, beta-1,4-glucan, such as cellulose, mucopolysaccharides, such as hyaluronic acid, etc. Mixtures of multiple framework formers may also be used.

According to the present invention, the natural polysaccharide has a component of carboxylate or carboxylic acid groups. Carboxylic acid groups are uncharged organic functional compounds, which have a carboxy group (—COOH). If a carboxy group is deprotonated, a carboxylate group having a single negative charge is obtained. In general, the salts of carboxylic acids are referred to as carboxylates.

According to the present invention, the proportion of carboxylate or carboxylic acid groups is greater than or equal to 0.5 and less than or equal to 2.0 in relation to the number of monomer units. In general, the individual component or the base unit, from which the larger macromolecular compounds, the polymers, are constructed by aggregation, is referred to as a monomer unit. In the case of alginates, for example, mannuronic acid and guluronic acid form the monomer units, from which the alginic acid is synthesized.

According to the present invention, the viscoelastic gel is synthesized from natural polysaccharides, which include n monomer units. According to the present invention, a polysaccharide thus has at least n/2 carboxylate or carboxylic acid groups. This means, considered statistically, at least every second monomer unit bears a carboxylate or carboxylic acid group. The proportion of carboxylate and carboxylic acid groups in relation to the number of monomers is accordingly 0.5. Without being bound by theory, the presence of protonated carboxylic acid groups or non-protonated carboxylate groups on the polymer results in a particularly good network structure, which results in particularly good stabilization of the active material. In one particular specific embodiment, the natural polysaccharide bears a carboxylic acid or carboxylate group on each monomer unit.

The polymeric gel former may be used in a weight ratio of greater than or equal to 0.05 to less than or equal to 2.0 in relation to the weight of the metallic active material. Still more particularly, the weight ratio between polymeric gel former and active material is greater than or equal to 0.05 to less than or equal to 1.5.

In one particular specific embodiment of the present invention, the cathode unit is characterized in that the viscoelastic, polymeric gel former is made of a salt of an alginic acid. The underlying alginic acid is a natural, acid polysaccharide, which is obtained above all from so-called brown algae. Alginic acid may in general be extracted from Phaeophyceae, for example, Macrocysti, *Laminaria, Ecklonia, Ascophyllum nodosum, Durvillea*, gold brown algae (Chrysophyceae), yellow green algae (Xanthophyceae) or diatoms (Bacillariophyta) and bacteria (which may be *Azotobacter bacteria*, for example, *Azotobacter chroococcum, Azotobacter venelandii*). The alginic acid is extracted having a high molecular weight, which varies from approximately 5000 to 200,000 Dalton, and contains chains which are formed from D-mannuronic acid and L-guluronic acid with the general chemical formula $(C_6H_8O_6)_n$. The degree of polymerization changes as a function of the type of algae used for the extraction, the season in which the algae were collected, and the point of origin of the algae, and also the age of the plants. The main types of brown algae from which alginic acid is obtained are, for example, *Macrocystis pyrifera, Laminaria cloustoni, Laminaria hyperborea, Laminaria flexicaulis, Laminaria digitata, Ascophyllumnodosum*, and *Fucus serratus*. Alginic acid or alkaline alginates may also be obtained by microbiology, however, for example by fermentation with *Pseudomonas aeruginosa* or mutants of *Pseudomonas putida, Pseudomonas fluorescens*, or *Pseudomonas mendocina* (see, for example, EP-A-251905 and Römpp Chemie Lexikon [Chemical Lexicon] "Naturstoffe [Natural Materials]" Thieme Verlag, 1997, and documents cited therein). The molecular weight of the alginates may be determined, for example, with the aid of SEC-MALLS (size exclusion-multi-angle laser light scattering) in aqueous solution according to the known methods of technology.

In one particular specific embodiment, alginates having an M/G block ratio in a range between greater than or equal to 0.5 and less than or equal to 5.0 may particularly be used. Still more particularly, the M/G block ratio of the specific embodiment is greater than or equal to 0.6 to less than or equal to 2.5. Without being bound by theory, this M/G block ratio may result in particularly mechanically stable gels, which protect the active material particularly well from undesirable secondary reactions. Furthermore, the mesh width of the resulting gels appears to be particularly well suited for selective lithium-ion conduction. It also appears to be particularly advantageous for the alginates to be provided in unbranched form.

The alginic acid may be partially neutralized by the addition of bases and thus converted into a poly-anionic polymer, the salt of an alginic acid. By adding the corresponding bases, for example, sodium, potassium, ammonium, calcium alginates, or, for example, propylene glycol, alginates or arbitrary mixtures thereof may be obtained. A partial salt of the alginic acid describes that not all free carboxylic acid groups must be converted into carboxylates by releasing a proton. Both deprotonated and also protonated carboxylates/carboxylic acids may be provided on the same polymer according to the present invention. Salts of the alginic acid which are partially or entirely neutralized by sodium hydroxide solution may particularly be used. Without being bound by theory, a situation is obtained by the use of partially neutralized alginic acid in which the stabilization of the gel forming in solution is provided via electrostatic interactions between the carboxylate and carboxylic acid groups. This may contribute to improving the cycle stability of battery cathodes.

In one specific embodiment of the present invention, the ratio of carboxylic acid to carboxylate groups on the polymeric gel formers may be greater than or equal to 0.0001 to less than or equal to 1.0. Still more particularly, the ratio may be 0.001 to 0.5. A ratio of 0.1, for example, means that the polymer bears 10 times more carboxylate groups than carboxylic acid groups. According to the present invention, situations may also exist in which all carboxylic acid groups of the polymer are present in deprotonated form as carboxylates.

In another specific embodiment, the cathode unit is characterized in that the viscoelastic, polymeric gel former in aqueous solution has a viscosity of greater than or equal to 50 mPa and less than or equal to 15000 mPa. Without being bound by theory, the listed viscosity range may have the result that both a sufficiently high gel strength is achieved to protect the active material and, at the same time, good processing ability under shear stress is provided.

In another specific embodiment, the viscoelastic gel former in aqueous solution may have a viscosity of greater than or equal to 100 mPa and less than or equal to 10000 mPa. The viscosity of the polymeric gel former is determined in this case according to the method known to those skilled in the art at a temperature of 25° C. at 20 rpm in a 2% aqueous solution (w/w) of the polymeric gel former. A Brookfield viscometer having a number 3 spindle is used for the viscosity measurement.

In another embodiment according to the present invention, the cathode unit may be characterized in that the viscosity of the viscoelastic, polymeric gel former in solution is reduced, as a result of a shear stress of 100 times the yield point, by greater than or equal to 10% and less than or equal to 90%. The yield point of the polymer and the shear stress connected thereto is ascertained according to the known rheological method as specified, for example, in "Das Rheologie Handbuch: Für Anwender von Rotations— and oszillations-Rheometern [The Rheology Handbook: for Users of Rotation and Oscillation Rheometers]" second edition, 2007 by Thomas Mezger. Very generally, the yield point in rheology (deformation and flow behavior of materials) is the force which must be applied to make a material flow (lasting deformation).

In another embodiment according to the present invention, the cathode unit is characterized in that the cathode unit is an integral part of a lithium-ion battery or a lithium-polymer battery. Lithium-ion batteries or lithium-polymer batteries are classified as secondary batteries. Among the secondary cells and batteries, comparatively high energy densities are achieved by lithium-ion batteries. These batteries generally have so-called composite electrodes, which, in addition to electrochemically active components, also include electrochemically inactive components. Fundamentally, all materials which may absorb lithium ions and discharge them again come into consideration as electrochemically active components (often also referred to as active materials) for lithium-ion batteries. In this regard, the related art for the negative electrode includes in particular particles based on carbon, such as graphite carbon or non-graphite carbon materials, capable of the intercalation of lithium.

Furthermore, metallic and semimetallic materials, which may be alloyed with lithium, may also be used. Thus, for example, the elements tin, antimony, and silicon are capable of forming intermetallic phases with lithium. All electrochemically active materials are generally contained in the electrodes in particle form.

In another specific embodiment, the cathode unit is characterized in that the cathode contains sulfur, carbons, and a salt of an alginic acid. For example, alpha, beta, lambda, pi, and mu sulfur are mentioned as sulfur modifications usable for manufacturing a cathode unit. Cyclic sulfur compounds are also included according to the present invention, e.g., cyclohexasulfur, cycloheptasulfur, cyclooctasulfur, and larger sulfur rings having up to 20 sulfur atoms in the ring. Furthermore, polymeric sulfur is also included, also called catenapolysulfur, and sulfides and polysulfides.

All known chemical modifications made of carbon come into consideration as carbons. In particular graphite, carbon black, carbon nanotubes, fullerene, and/or diamond may be used as the particular modifications of carbon for constructing a cathode. In one specific embodiment, the ratio between the sum of sulfur and carbon and the salt of an alginic acid is between greater than or equal to 0.1:1 and less than or equal to 5:1, still more particularly between greater than or equal to 1:1 and less than or equal to 3:1, and still more particularly between greater than or equal to 2:1 and less than or equal to 3:1.

In another specific embodiment, the cathode unit is characterized in that the cathode contains nickel-cobalt-manganese oxide, a salt of an alginic acid, and optionally carbon. The nickel-cobalt-manganese oxide used may very generally correspond to the following stoichiometry: $X*Ni+Y*Co+Z*Mn$, X and Y and Z being able to be chosen freely in a range between greater than or equal to 0 and less than or equal to 1, with the proviso that $X+Y+Z$ is less than or equal to 1. Furthermore, the nickel-cobalt-manganese oxide used may also, in one particular specific embodiment, only contain pure manganese oxide. Furthermore, still further foreign metals such as aluminum may also be contained in this cathode composition. In addition, carbon in the above-described modifications may also optionally be added to the cathode material. In one specific embodiment, the ratio between the sum of nickel-cobalt-manganese oxide and carbon and the salt of an alginic acid is between greater than or equal to 1:1 and less than or equal to 50:1, still more particularly between greater than or equal to 5:1 and less than or equal to 40:1, and still more particularly between greater than or equal to 7:1 and less than or equal to 25:1.

In another particular specific embodiment, the cathode unit is characterized in that the cathode contains a composite material made of nickel-cobalt-manganese oxide, $Li_2MnO_3$, a salt of an alginic acid, and optionally carbon. The term composite material includes mixtures, "solid solutions," and/or a nanoscale compound of the individual components. In addition, carbon in the above-described modifications may optionally also be added to the cathode material.

The cathode may contain a composite material made of $Li_2MnO_3$, $LiMO_2$, and the salt of an alginic acid, the relationship between $Li_2MnO_3$ and $LiMO_2$ may result as m $Li_2MnO_3*(1-m)LiMO_2$ with m being greater than or equal to 0.4 and less than or equal to 0.7. Metal M may particularly be selected from the group of nickel, cobalt, and manganese. Furthermore, lithium metal oxide compounds may particularly be of the type $X*Li+Y*M+Z*O$, X and Y and Z being able to be chosen freely in a range between greater than or equal to 0 and less than or equal to 1, with the proviso that $X+Y+Z$ is less than or equal to 1.

The cathode may contain $Li_2MnO_3$ in quantities greater than or equal to 0 wt.-% and less than or equal to 80 wt.-%, still more particularly greater than or equal to 0 wt.-% and less than or equal to 70 wt.-%, and most particularly greater than or equal to 0 wt.-% and less than or equal to 60 wt.-%.

The cathode may contain nickel-cobalt-manganese oxides in quantities greater than or equal to 15 wt.-% and less than or equal to 80 wt.-%, still more particularly greater than or equal to 25 wt.-% and less than or equal to 60 wt.-%, and most particularly greater than or equal to 30 wt.-% and less than or equal to 55 wt.-%.

The cathode may contain a salt of an alginic acid in quantities greater than or equal to 2 wt.-% and less than or equal to 25 wt.-%, still more particularly greater than or equal to 3 wt.-% and less than or equal to 18 wt.-%, and most particularly greater than or equal to 4 wt.-% and less than or equal to 13 wt.-%.

The cathode may contain carbon in quantities greater than or equal to 0 wt.-% and less than or equal to 25 wt.-%, still more particularly greater than or equal to 0 wt.-% and less than or equal to 18 wt.-%, and most particularly greater than or equal to 0 wt.-% and less than or equal to 15 wt.-%.

The specifications about the weight proportions relate to the cathode total weight without metallic arrester.

According to the present invention, these cathode units may have a high redox potential for reversible lithium discharge and may ensure a high cell voltage together with a graphite negative.

The present invention is additionally directed to a method for manufacturing a cathode unit for a battery, characterized in that a) the viscoelastic polymeric gel former is added under shear stress to a solvent, b) the active material under shear stress is added to the dispersion from step a), and c) the dispersion obtained in step b) is applied to a metallic conductor.

In another particular specific embodiment, within the scope of the manufacturing, steps a) and b) may exchange places, i.e., in step a) firstly the active material is dispersed or dissolved and only subsequently, in step b), is the viscoelastic polymeric gel former under shear stress added thereto dissolved, or dispersed. Without being bound by theory, by adding the solids to the solvent, a dispersion, a suspension, or a solution thereof in the solvent is obtained.

Another aspect of the present invention is additionally in the use of a battery including a cathode unit according to the present invention for the power supply of mobile information devices, electrically operated tools, electrically operated vehicles, and for automobiles having hybrid drives or plug-in hybrid drives. Mobile information devices in the meaning of the present invention include all electrically operated mobile devices which are capable on request of providing, processing, and optionally exchanging with other devices items of information. These may include, for example, portable computers (laptops), PDAs, smart phones, mobile telephones, camcorders, portable audio devices, portable headphones, hearing aids, and other consumer applications. Of course, stationary electrical devices having batteries may also be operated containing the cathode units according to the present invention.

Electrically operated tools in the meaning of the present invention are all tools which may be operated without a permanent, wired connection to a power network.

Electrically operated vehicles in the meaning of the present invention include any type of transportation arrangement, which may be driven at least partially with the aid of electric power. This category includes, for example, electrically operated land, air, and water craft and special vehicles, e.g., golf carts, electric forklifts, and wheelchairs.

The installation of the batteries having the cathode units according to the present invention may particularly be used in automobiles which are operated solely electrically, or vehicles having hybrid drives or plug-in hybrid drives. This is true in particular in cases where a high capacity and a high cycle number are necessary to maintain a long range based on solely electric drive energy.

EXAMPLES

Example 1: Manufacture of an Li/S Cathode

As active material, 3 g sulfur with NMP (N-methyl-2-pyrrolidone) as a solvent are placed in a speed mixer (Ultra-Turrax IKA T 25) and stirred at 12000 RPM and at 20° C.-30° C. for 30 minutes. After a homogeneous distribution of the solids in the solvent has been obtained, 0.5 g of a conducting additive in the form of carbon black (Super P-Serie from TIMCAL) is added thereto and the mixture is stirred for another 10 minutes. Subsequently, 1 g sodium alginate (Sigma Aldrich) and 0.5 g graphite are added thereto and the dispersion is stirred for another 5 minutes, until a homogeneous distributions of the solids in the solvent is achieved. The weight ratio (w/w) of the solids in the dispersion is 60% sulfur, 10% carbon black, 10% graphite, 20% sodium alginate.

The dispersion thus obtained is applied with the aid of a doctor blade under shear stress by spreading onto an aluminum foil (the thickness) as a current arrester. Due to the shear stress, the viscosity of the dispersion is decreased during the application by approximately 30%. A bubble-free and uniform coating of the electrode by the dispersion is achieved due to the doctor blade process. Subsequently thereto, the electrode precursor stage is thermally dried for two hours at 60° C. according to the method known in the general related art. Subsequently, the pre-dried electrode is dried for a further 12 hours under a reduced pressure of <1000 mbar at 60° C. The electrode thus obtained has a thickness of 90 µm. The thickness of the electrode may be varied as a function of the applied dispersion quantity in a range between 20 µm and 200 µm.

The cycle stability of the Li/S electrode thus obtained is significantly greater than the cycle stability of a cathode which was manufactured using an equivalent quantity of PVDF as a binder component.

Example 2: Manufacture of an NCM Cathode

Similarly to example 1, a cathode is manufactured using an NCM active material. The weight ratio (w/w) of the solids in the dispersion is 85% Li(Ni ⅓ Co ⅓ Mn ⅓)O$_2$, 10% carbon black, and 5% sodium alginate.

The dispersion is applied with the aid of a doctor blade under shear stress by spreading onto an aluminum foil (the thickness) as a current arrester. Due to the shear stress, the viscosity of the dispersion is decreased during the application by approximately 20%. A bubble-free and uniform coating of the electrode by the dispersion is achieved due to the doctor blade process. Subsequently thereto, the electrode precursor stage is thermally dried for 2 hours at 60° C. according to the method known in the general related art. Subsequently, the pre-dried electrode is dried for a further 12 hours under a reduced pressure of <1000 mbar at 60° C. The electrode thus obtained has a thickness of 100 µm. The thickness of the electrode may be varied as a function of the applied dispersion quantity in a range between 20 µm and 200 µm.

The cycle stability of the NCM electrode thus obtained is significantly greater than the cycle stability of a cathode which was manufactured using an equivalent quantity of PVDF as a binder component.

Example 3: Manufacture of an HE-NCM Cathode

Similarly to example 1, a cathode is manufactured using an HE-NCM active material. The HE-NCM active material is manufactured according to the methods known to those skilled in the art and is composed of 45% NCM and 55% Li$_2$MnO$_3$. The weight ratio (w/w) of the solids in the dispersion is 85% HE-NCM, 10% carbon black, and 5% sodium alginate.

The dispersion is applied with the aid of a doctor blade under shear stress by spreading onto an aluminum foil (the thickness) as a current arrester. Due to the shear stress, the viscosity of the dispersion is decreased during the application by approximately 25%. A bubble-free and uniform coating of the electrode by the dispersion is achieved due to the doctor blade process. Subsequently thereto, the electrode precursor stage is thermally dried for 2 hours at 60° C. according to the method known in the general related art. Subsequently, the pre-dried electrode is dried for a further 12 hours under a reduced pressure of <1000 mbar at 60° C. The electrode thus obtained has a thickness of 100 µm. The thickness of the electrode may be varied as a function of the applied dispersion quantity in a range between 20 μm and 200 μm.

The cycle stability of the HE-NCM electrode thus obtained is significantly greater than the cycle stability of a cathode which was manufactured using an equivalent quantity of PVDF as a binder component.

What is claimed is:

1. A cathode unit for a battery, comprising:
   a cathode having a viscoelastic, polymeric gel former selected from the group of natural polysaccharides having a proportion of carboxylate or carboxylic acid groups of greater than or equal to 0.5 and less than or equal to 2.0 in relation to the number of the monomer units;
   wherein the cathode contains $Li_2MnO_3$.

2. The cathode unit of claim 1, wherein the viscoelastic, polymeric gel former is made of a salt of an alginic acid.

3. The cathode unit of claim 1, wherein the viscoelastic, polymeric gel former in aqueous solution has a viscosity of greater than or equal to 100 mPa and less than or equal to 15000 mPa.

4. The cathode unit of claim 1, wherein the viscosity of the viscoelastic, polymeric gel former in solution is reduced as a result of a shear stress of 100 times the yield point by greater than or equal to 10% and less than or equal to 90%.

5. The cathode unit of claim 1, wherein the cathode unit is an integral part of a lithium-ion battery or a lithium-polymer battery.

6. The cathode unit of claim 1, wherein the cathode contains sulfur, carbons, and a salt of an alginic acid.

7. The cathode unit of claim 1, wherein the cathode contains nickel-cobalt-manganese oxide, a salt of an alginic acid, and optionally carbon, or the cathode contains a composite material made of nickel-cobalt-manganese oxide, $Li_2MnO_3$, a salt of an alginic acid, and optionally carbon.

8. The cathode unit of claim 1, wherein the cathode includes:
   greater than 0 wt.-% and less than or equal to 70 wt.-% $Li_2MnO_3$,
   greater than or equal to 15 wt.-% and less than or equal to 98 wt.-% nickel-cobalt-manganese oxide,
   greater than or equal to 2 wt.-% and less than or equal to 25 wt.-% salt of an alginic acid, and
   greater than 0 wt.-% and less than or equal to 25 wt.-% carbon.

9. The cathode unit of claim 1, wherein the cathode contains a composite material made of nickel-cobalt-manganese oxide, the $Li_2MnO_3$, a salt of an alginic acid, and carbon.

10. A method for manufacturing a cathode unit for a battery, the method comprising:
    a) a viscoelastic polymeric gel former is added under shear stress to a solvent;
    b) an active material under shear stress is added to the dispersion from a); and
    c) a dispersion obtained in b) is applied to a metallic conductor;
    wherein the viscoelastic, polymeric gel former is selected from the group of natural polysaccharides having a proportion of carboxylate or carboxylic acid groups of greater than or equal to 0.5 and less than or equal to 2.0 in relation to the number of the monomer units.

11. A battery, comprising:
    cathode unit for a battery, including a cathode having a viscoelastic, polymeric gel former selected from the group of natural polysaccharides having a proportion of carboxylate or carboxylic acid groups of greater than or equal to 0.5 and less than or equal to 2.0 in relation to a number of the monomer units, wherein the cathode contains $Li_2MnO_3$.

12. A cathode unit for a battery, comprising:
    a cathode having a viscoelastic, polymeric gel former selected from the group of natural polysaccharides having a proportion of carboxylate or carboxylic acid groups of greater than or equal to 0.5 and less than or equal to 2.0 in relation to the number of the monomer units;
    wherein the cathode contains nickel-cobalt-manganese oxide, a salt of an alginic acid, and carbon.

* * * * *